Oct. 6, 1959  H. A. WEINER  2,907,299
DUST CHAMBER COATING DEVICE
Filed April 21, 1958
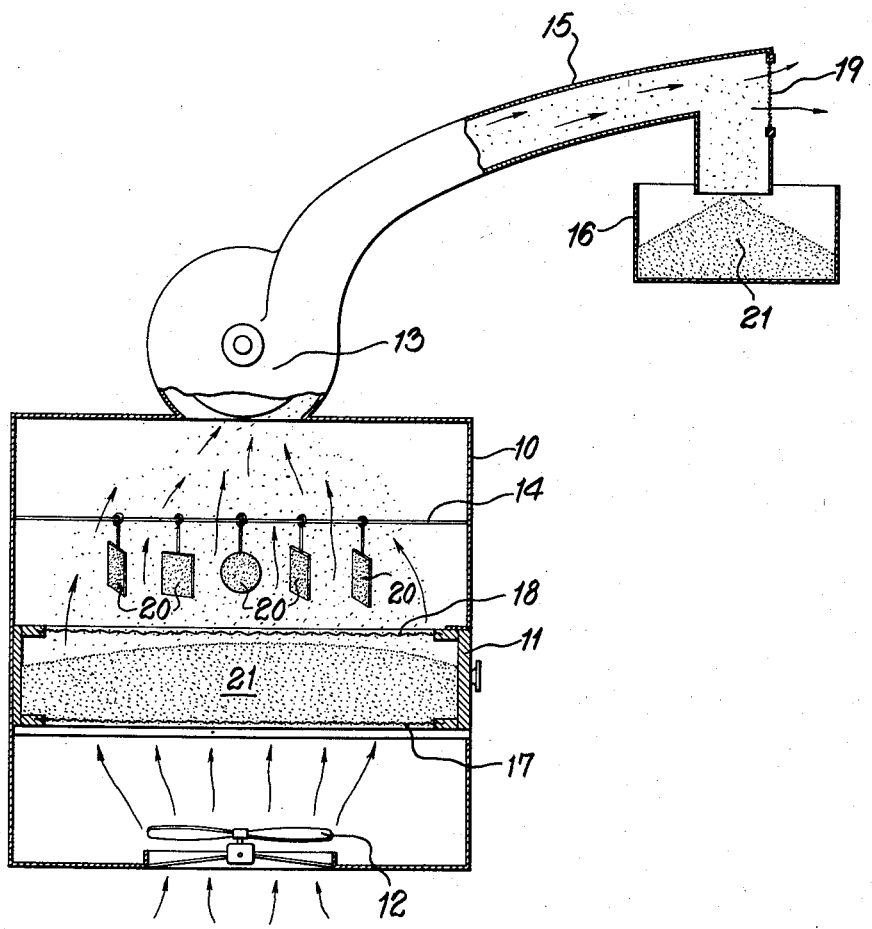
INVENTOR.
HERBERT A. WEINER
BY
ATTORNEY United States Patent Office 2,907,299
Patented Oct. 6, 1959

2,907,299
DUST CHAMBER COATING DEVICE

Herbert A. Weiner, Perth Amboy, N.J., assignor to Gulton Industries, Inc., Metuchen, N.J., a corporation of New Jersey Application April 21, 1958, Serial No. 729,758

5 Claims. (Cl. 118—309)

My invention relates to coating devices and in particular to those devices whereby it is possible to coat elements by applying powdered refractory material, powdered metal, graphite and like products thereto.

Up to now, there has been no simple, economical device for coating small objects with powdered refractory material or other dusts. It is often necessary to coat these objects with ceramic or other dusts for the following reasons:

(1) To provide surfaces possessing properties such as thermal and/or electrical insulation, corrosion resistance, abrasion resistance and high refractoriness.

(2) To increase the refractoriness of low melting materials.

Accordingly, it is an important object of my invention to provide a coating device which is simple and economical to produce and operate.

It is a further object of my invention to provide such a device wherein it is easy to recover the powder which does not adhere to the articles being coated.

It is a still further object of my invention to provide such a device wherein it is possible to change the coating materials being used simply and easily.

Other objects, features and advantages of my invention will be apparent during the course of the following description when taken in connection with the accompanying drawing which is a front elevational view, partly in section, of a preferred embodiment of my invention.

In the drawing, wherein, for the purpose of illustration, is shown a preferred embodiment of my invention, the numeral 10 designates the housing in which is inserted drawer 11. Fan 12 is located in the lower portion of housing 10 and serves to provide a blast of air in the direction of the arrows in the figure. Exhaust fan 13 is located at the top of housing 10 and serves to draw the unused dust out of the housing and into outlet pipe 15. Rod 14 is affixed to the housing 10 and serves to support specimens 20 which are to be coated with dust 21. Drawer 11 has its lower and upper surfaces 17 and 18 formed of openwork wire mesh or similar material. Lower surface 17 is of approximately 400 mesh and upper surface 18 is of approximately 200 mesh when ceramic dust 21 is of approximately 325 mesh, whereby lower surface 17 is pervious to air but not dust 21 and upper surface 18 is pervious to both air and dust 21. At the end of pipe 15, screen 19 of about 400 to 500 mesh is placed so that the particles of dust 21 which do not adhere to the specimens 20 will not be carried out of the system but rather will be collected in box 16. The screen mesh sizes given above are merely illustrative examples since it will be obvious to one skilled in the art that surface 18 must be of such mesh size as to be pervious to the desired size of dust particle being used and surface 17 and screen 19 must be impervious to the desired size of dust particle being used.

It can be seen that the particles of ceramic dust 21 which are collected in 16 may be recovered and reused without any reprocessing other than placing them in drawer 11. It can also be seen that since no heat is used, the system is clean and it is therefore possible to use dusts of different colors and sizes successively without any interference of one with the other. It is within the contemplation of my invention to use several drawers 11 with different meshes of surfaces 17 and 18 in order to achieve flexibility of operation. I choose to keep the mesh of screen 19 finer than any of the dusts 21 which may be used so that it is not necessary to make any changes in it.

Box 16 is arranged so that it may be detached from pipe 15 (details not shown) and emptied and cleaned. If desired, several boxes 16 may be provided so that the recovered ceramic dusts are not mixed at all.

If desired, the lower portion of housing 10 may be open with supporting legs supporting the upper portion of housing 10 and the runners which hold drawer 11 in place.

In operation, specimens 20 are coated with a suitable adhesive such as sodium silicate type cements or other ceramic or organic adhesives and are suspended from rod 14. Drawer 11 is filled with ceramic dust 21 which may be alumina, mica, talcum, graphite, powdered metals or any other powdered material and the drawer is placed in housing 10.

Fans 12 and 13 are turned on and dust 21 is air carried past specimens 20 in the direction of the arrows in the figure. Dust 21 will adhere to specimens 20 because of the adhesive on specimens 20 but the particles of dust 21 will not adhere to each other because they are dry and do not carry any adhesive. The excess particles of dust 21 which do not adhere to specimens 20 are carried through outlet pipe 15 and since screen 19 is pervious to air but not to dust 21 the dust collects in box 16. The flow of air is in the direction of the arrows in the figure.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. A device to coat elements by applying powdered material thereto which comprises in combination a hollow housing having a drawer which is movable into and out of said housing, the lower surface of said drawer being pervious to air flow but impervious to the particles of said powdered material, said drawer having an upper surface substantially parallel to said lower surface, which upper surface is pervious both to the passage of air and to the passage of particles of said powdered material, a source of a blast of air directed to pass transversely though the lower and upper surfaces of said drawer, means within said housing for supporting at least one said element, coated with a vehicle to which said powder adheres, in the path of said air blast above the upper surface of said drawer, air exhausting means connected in the upper end of said housing above said supporting means, an outlet pipe and a particle collection chamber connected to said housing in the path of said air exhaust, and an outlet pervious to air but not to said particles for permitting air to be exhausted from said chamber.

2. A device to coat elements by applying powdered material thereto as described in claim 1 wherein a plurality of said elements are supported within said housing by said supporting means.

3. A device to coat elements by applying powdered material thereto as described in claim 1 wherein said source of a blast of air to pass transversely though the lower and upper surfaces of said drawer is a fan mounted in the lower portion of said housing below said drawer.

4. A device to coat elements by applying powdered material thereto to coated elements as described in claim 1 wherein said air exhausting means is a fan.

5. A device to coat elements by applying powdered material thereto to coated elements as described in claim 1 wherein the lower surface of said drawer is a 400 mesh screen and the upper surface of said drawer is a 200 mesh screen.

References Cited in the file of this patent

UNITED STATES PATENTS

| | | |
|---|---|---|
| 226,760 | Kurtz | Apr. 20, 1880 |
| 1,068,733 | Bradley | July 29, 1913 |
| 2,633,824 | Dunn et al. | Apr. 7, 1953 |
| 2,643,188 | Meyer | June 23, 1953 |

UNITED STATES PATENT OFFICE

CERTIFICATE OF CORRECTION

Patent No. 2,907,299                                                                         October 6, 1959

Herbert A. Weiner

It is hereby certified that error appears in the printed specification of the above numbered patent requiring correction and that the said Letters Patent should read as corrected below.

Column 3, line 1, Claim 4, and line 4, Claim 5, strike out "to coated elements", each occurrence.

Signed and sealed this 5th day of April 1960.

(SEAL)
Attest:

KARL H. AXLINE
Attesting Officer

ROBERT C. WATSON
Commissioner of Patents